(No Model.)
W. T. BAKER & J. H. SHULL.
PULLEY.
No. 299,322. Patented May 27, 1884.
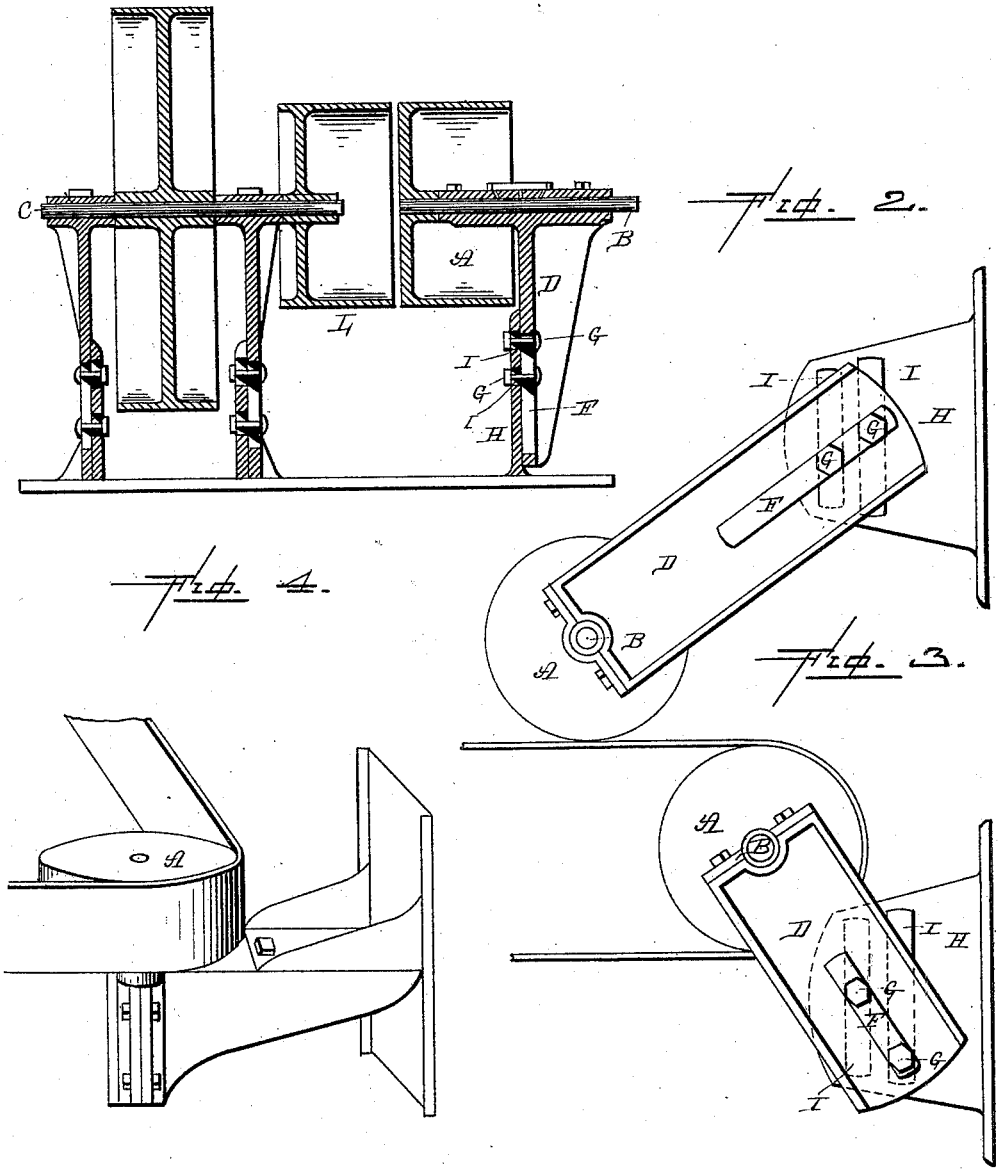

UNITED STATES PATENT OFFICE.

WILLIAM T. BAKER AND JOHN H. SHULL, OF FINDLAY, OHIO.

PULLEY.

SPECIFICATION forming part of Letters Patent No. 299,322, dated May 27, 1884.

Application filed March 10, 1884. (No model.)

*To all whom it may concern:*

Be it known that we, WILLIAM T. BAKER and JOHN H. SHULL, of Findlay, in the county of Hancock and State of Ohio, have invented certain new and useful Improvements in Pulleys; and we do hereby declare the following to be a full, clear, and exact description of the invention, such as will enable others skilled in the art to which it pertains to make and use it, reference being had to the accompanying drawings, which form part of this specification.

Our invention relates to an improvement in pulleys; and it consists in the combination of a suitable base or hanger, which can be secured either to the floor overhead or a support of any kind, and which is provided with suitable slots, with the bearing upon which the pulley is journaled, the bearing being provided with a suitable slot, so that it can be adjusted outward as well as laterally, as will be more fully described hereinafter.

The object of our invention is to provide an independent loose pulley, or a pulley which can be placed in any position, adapted as a return or a tightening pulley, as may be desired.

Figure 1 represents a longitudinal vertical section of a pulley embodying our invention, showing it used as a loose pulley independently of the driving-shaft. Fig. 2 is an end view showing the pulley used as an idler or tightening pulley. Figs. 3 and 4 show different views of the pulley used as a return-pulley.

The great trouble heretofore with loose pulleys placed upon the driving-shaft has been that they wear the shaft to such an extent that they have frequently to be removed, and either the pulley itself or the shaft repaired. While this is being done, all of the machinery that is being run from this shaft is idle, and hence considerable expense and loss are incurred each time that the loose pulley gets out of true. In order to avoid this loss, we place our pulley A upon the shaft B, of suitable length, which is entirely separate and distinct from the main driving-shaft C, and which shaft B is journaled in a suitable bearing, D, provided especially for it. The length of the shaft B will be such that a firm and secure support for the pulley under all circumstances is insured. The bearing D has a vertical slot, F, made through it, and through this slot will be passed the two clamping-bolts G, for the purpose of connecting it to the base or hanger H, which is provided with the two lateral slots I. This part H may either be placed upon the floor or any other suitable support that may be preferred, or it may be secured overhead, and thus act as a hanger. The horizontal slots through the part H and the vertical slot F through the bearing D enable the bearing to be moved in and out so as to adjust the pulley A into an exact line with the fast pulley L on the driving-shaft C, or to adjust the pulley into any desired position, as shown in Figs. 2, 3, and 4, so that it can be used as a loose pulley, a tightening or a return pulley, as may be desired. Where the pulley A is to be used as a loose pulley in connection with a machine of any kind which is already provided with a loose pulley, it will be necessary to remove the loose pulley, cut away that portion of the shaft, and then adjust the pulley A in the relation to the fast pulley as shown in Fig. 1.

Having thus described our invention, we claim—

The combination of the pulley secured to a short shaft and the bearing in which the shaft is journaled, and which is provided with a vertical slot, with a base or hanger provided with transverse slots, and the clamping-bolts for securing the bearing in position, substantially as shown and described.

In testimony whereof we affix our signatures in presence of two witnesses.

WILLIAM T. BAKER.
JOHN H. SHULL.

Witnesses:
SAM. HORBER,
D. T. WINDERS.